United States Patent [19]

Hartzler et al.

[11] 4,039,502

[45] Aug. 2, 1977

[54] POLYHYDRAZIDE SPINNING SOLUTIONS

[75] Inventors: John David Hartzler, Kinston, N.C.; Paul Winthrop Morgan, West Chester, Pa.

[73] Assignee: E. I. Du Pont de Nemours & Company, Wilmington, Del.

[21] Appl. No.: 646,356

[22] Filed: Jan. 2, 1976

[51] Int. Cl.$^2$ .............................................. C08K 3/24
[52] U.S. Cl. ............................ 260/30.8 R; 260/78 R; 260/78 S; 264/178 R; 162/157 R
[58] Field of Search ..................... 260/30.8 R, 78 R

[56] References Cited
PUBLICATIONS

Journal of Polymer Science, Part A, 2 pp. 1147–1156 (1964).
Polymer Science U.S.S.R. 9, No. 1, pp. 94–99 (1967).

*Primary Examiner*—Stanford M. Levin

[57] ABSTRACT

This invention relates to film- and fiber-forming polyhydrazide solutions (dopes) in a solvent system comprising concentrated sulfuric acid or mixtures thereof with fluorosulfonic acid. Some dopes of this invention are optically anisotropic.

8 Claims, No Drawings

POLYHYDRAZIDE SPINNING SOLUTIONS

BACKGROUND OF THE INVENTION

The prior art suggests that polyhydrazides are degraded in sulfuric acid. Optically anisotropic solutions of (co)polyhydrazides in concentrated (at least 99.5%) sulfuric acid are not taught in the art.

In the solutions of this invention, there is some degradation of the polymeric species (e.g., as evidenced by a fiber exhibiting a lower inherent viscosity value than the polymer from which the spinning solution was prepared), but the solutions are sufficiently stable to permit preparation of shaped articles which exhibit desirable properties, e.g., high strength fibers.

SUMMARY OF THE INVENTION

This invention provides novel spinning solutions of film-and fiber-forming polymers comprising at least 5% by weight of certain (co)polyhydrazides in concentrated sulfuric acid (at least 99.5% but not greater than 102% concentration) or in a mixture thereof with fluorosulfonic acid.

The (co)polyhydrazides consist essentially of repeating units of the formula

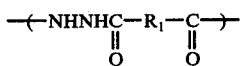
                I the divalent radical $R_1$ in each repeating structural unit may be the same or different and is selected from the group of aromatic, carbocyclic and aliphatic radicals of from 1 to 12 carbon atoms; 2,5-pyridinediyl radicals or a chemical bond. Some of these solutions are optically anisotropic.

A group of (co)polyhydrazides that are useful in preparing optically anisotropic solutions in the solvents under consideration are poly(chloroterephthaloyl hydrazide) and copolymers thereof represented by repeating units of the formula

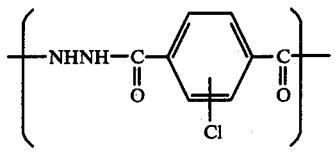

with up to 80 mole % (based on the total number of repeating units) of

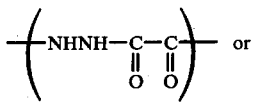

units or with up to 70 mole % (based on the total number of repeating units) of

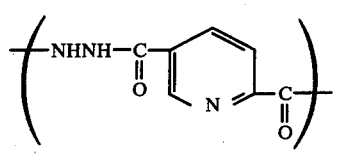

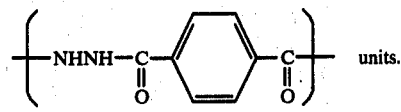 units.

Useful polymers exhibit inherent viscosities of at least about 0.4, preferably at least about 0.7, and most preferably at least about 1.0, measured as described hereinafter.

DESCRIPTION OF THE PREFERRED EMBODIMENTS

Useful Polyhydrazides And Copolyhydrazides

The polymers useful for preparing these novel solutions, both isotropic and anisotropic, may be prepared by the low temperature solution polymerization process described in Frazer U.S. Pat. Nos. 3,130,182, 3,130,183, and 3,536,651. In this process, at least one hydrazine or dihydrazide is caused to react with a dicarboxylic acid halide (preferably a diacid chloride) in a solvent system at low temperatures. Useful copolyhydrazides may possess both random and ordered structures.

Dicarboxylic acid chlorides and dihydrazides from which the polyhydrazides and copolyhydrazides useful in this invention may be prepared include those of oxalic acid, isophthalic acid, terephthalic acid, chloroterephthalic acid, 4,4'-bibenzoic acid, 2,5-dihydroterephthalic acid, pyridine-2,5-, 2,6-, and 3,5-dicarboxylic acids, and derivatives thereof wherein the aromatic nuclei may bear susbsituents such as lower alkyl groups (i.e., 1-4 carbon atoms), halogen atoms, and other non-reactive substituents. Examples of such derivatives are 4-fluoroisophthaloyl chloride, 5-chloroisophthaloyl chloride, 4,6-dichloroisophthaloyl chloride, 4-bromoisophthaloyl chloride, 5-tertiary butylisophthaloyl chloride, 2-methylisophthaloyl chloride, 4,6-dimethylisophthaloyl chloride, 4-methoxyisophthaloyl chloride, 5-methoxyisophthaloyl chloride, 2,4-dimethoxyisophthaloyl chloride, and the related terephthaloyl chloride derivatives. By "nonreactive substituents" is meant a grouping of atom(s) which will not react appreciably with either carboxylic hydrazides or carbonyl chlorides under the polymerization conditions. Other useful reactants include the dihydrazides prepared from malonyl, succinyl, glutaryl, fumaryl, methylfumaryl, dimethylfumarly, 1,3-cyclohexanedicarbonyl, and 1,4-cyclohexanedicarbonyl esters. Random copolymers may be prepared by the procedures described in, e.g., Frazer U.S. Pat. No. 3,130,182.

Among the preferred polyhydrazides and copolyhydrazides which are useful in preparing the solutions of the present invention may be named poly(chloroterephthalic hydrazide), poly(terephthalic/2,5-pyridinediyl hydrazide), poly(terephthalic/chloroterephthalic hydrazide), poly(chloroterephthalic/oxalic hydrazide) and poly(terephthalic/isophthalic hydrazide).

Preparation of the (co)polydydrazides

The (co)polyhydrazides are prepared by low temperature solution polymerization techniques similar to those described in, e.g., Frazer — U.S. Pat. No. 3,130,183. In this process, the dihydrazide(s) may be caused to react with a dicarboxcyclic acid halide(s) (preferably a diacid chloride) in a liquid, basic medium which serves as both solvent and acid acceptor. The polymerization is carried out at low temperatures, preferably within the range of 0°-30° C. Suitable solvents include N,N-dimethylacetamide (DMAc), N-methylpyrrolidone-2 (NMP), and hexamethylphosphoramide (HMPA). Small amounts of LiCl may be present during the polymerization since the solvent power of the above cited amide media for the polymer is increased when the salt is present, thus favoring the formation of polyhydrazides of higher molecular weight. The necessary dihydrazides may be obtained commercially (e.g., oxalyl dihydrazide) or they may be prepared by, e.g., heating together a combination of a dimethyl or diethyl ester of a dibasic acid (e.g., dimethylterephthalate), hydrazine hydrate, and a quantity of an inert liquid (e.g., benzene) to form, e.g., terephthaloyl dihydrazide. Other useful dihydrazides are chloroterephthaloyl and 2,5-pyridinediyl dihydrazides. Heating (e.g., on steam bath) may be carried out for as long as 48 hours. After the reaction mixture has been cooled, the solid dihydrazide which has precipitated may be collected and recrystallized from water.

The preferred diacid chlorides used to prepare the polyhydrazides of the invention are chloroterephthaloyl chloride, terephthaloyl chloride, and 2,5-pyridinedicarbonyl chloride.

In preparing these (co)polyhydrazides, chain terminators may be used. Among the suitable chain terminators are compounds which can react monofunctionally with the acid chloride ends of these polymers, such as ammonia, ethylamine, dimethylamine, diethylamine, aniline, etc. Other terminators include hydroxylic compounds, such as methyl alcohol, ethyl alcohol, isopropyl alcohol, phenol and water. Useful terminators which react monofunctionally with the —NH$_2$ ends of these polymer chains include other diacid chlorides, e.g., acetyl chloride, acid anhydrides, e.g., acetic anhydride, and isocyanates, e.g., phenyl isocyanate.

Preparation of the Solutions

The solvents useful for preparing the solutions of this invention are (1) concentrated sulfuric acid within the concentration range of about 99.5 to 102%, preferably 100 to 101% H$_2$SO$_4$, and (2) mixtures thereof with up to 80% of fluorosulfonic acid.

The solutions are prepared by first combining, under anhydrous conditions and with stirring and mixing, suitable quantities of the appropriate polymer or copolymer with the sulfuric acid or the acid mixtures to form compositions containing from about 5 to 25% by weight polymer or copolymer, preferably about 15 to 20% be weight. Generally during addition of the polymer, the heat of mixing should be controlled in order that the temperature of the combined ingredients does not exceed 30° C, preferably not over 15° C. This may be accomplished by using cooled samples of acid(s), application of external cooling baths to the mixing vessel, controlled rate of addition of the solid material, appropriate stirring action, and/or combinations of these procedures. On occasion it may be desirable to employ the acid(s) at room temperature or even in a moderately heated state, e.g., at about 50° C, to achieve more rapid dissolution of the added polymeric solid. During preparation and spinning, solutions should be maintained at temperatures which reduce the opportunity for polymer degradation to occur.

Excessive water can interfere with the formation of solutions suitable for spinning and can contribute to degradation of the polymer. Solutions should be prepared with relatively dry polymer samples under conditions where exposure to atmospheric moisture is minimized, e.g., under a blanket of dry nitrogen.

Anisotropic Character of the Solutions

The optically anisotropic solutions of the invention have microscopic regions that are birefringent; a bulk solution sample depolarizes plane-polarized light because the light transmission properties of the microscopic areas of the solution vary with direction. This characteristic is associated with the existence of at least part of the solution in the liquid crystalline or mesomorphic state. The liquid crystalline state of the solutions of this invention is believed to be of the nematic type.

The solutions which exhibit optical anisotropy do so while the solution is in the relaxed state. This is in contrast to conventional polymeric solutions which may be caused to depolarize plane-depolarized light when subjected to appreciable shear.

There is a complex relationship existing among, e.g., the concentration of the particular polymer or copolymer species, the inherent viscosity thereof, the solvent system, and the solution temperature which generally determines the ranges in which a given solution is anisotropic or isotropic. Clearly not all combinations will yield anisotropic solutions. A useful polymer concentration-soltuion viscosity relationship exists for given polymer-solvent combinations which are capable of forming the anisotropic solutions of this invention. For such combinations, the solution formed is isotropic when the polymer concentration is below a particular level. As the concentration of the polymer is increased, the viscosity of the solution increases. However, at a point referred to herein as the "critical concentration point" there is a sharp discontinuity in the slope of the viscosity v. concentration curve when the solution changes from isotropic to partially anisotropic without the formation of a solid phase. Further addition of polymer results in a decrease in the viscosity of the solution as it becomes more anisotropic. An exemplary viscosity vs. concentration curve may be prepared as shown for the anisotropic systems described in U.S. Pat. No. 3,671,542. The critical concentration point (as well as the complete viscosity v. concentration curve is routinely determined using conventional concentration and viscosity measuring techniques. For example, a polymer solution of this invention may be placed in a suitable vessel equipped with a polytetrafluoroethylene cap through which a viscometer spindle extends, without contact, into the solution with constant temperature being maintained. The viscosity of the solution may be conventionally measured with a viscometer (e.g., a Brookfield Syncho-Lectric Viscometer, Model RV, product of the Brookfield Engineering Laboratories, Inc., Straughton, Mass., or equivalent). Viscosity measurements are made at the initial polymer concentration and at higher concentrations (i.e., after an additional known amount of polymer is added). By this technique (or equivalent) a viscosity vs. concentration curve may be plotted for this system (the given polymer and liquid medium at that temperature) and the critical concentration point (i.e., the discontinuity in the slope of the curve) is determined.

A qualitative determination of optical anisotropy in the solutions of this invention can be conveniently made using a light source, analyzer, and crossed polarizer (or equivalents thereof). Commerically available polarizing microscopes may be useful for the qualitative determination of optical anisotropy for the solutions of this invention, as may pieces of Polaroid HN film.

Another qualitative determination of the anisotropic character of these solutions may be made with the naked eye. These solutions may appear turbid or hazy and yet contain no or practically no undissolved solid. When the solution, seen under reflected ordinary light, is disturbed by shaking or rolling the vessel containing the solution, or by only slow stirring, there is produced a characteristic, readily observed, satin-like sheen or glow which is observed even after the disturbance ceases, and which decreases in intensity thereafter. This may be described as being a pearly or opalescent quality of the solution. Solutions which are disturbed as described above often give the appearance of having striations and/or graininess in the surface. These visual effects are observed in the anisotropic solutions of this invention. This may commonly be referred to as "stir opalescence". Further details on qualitative and quantitative determinations of optical anisotropy are presented in U.S. Pat. No. 3,671,542. The latter patent describes the improved properties (e.g., higher tenacity and initial modulus) in fibers spun from anisotropic, rather than isotropic, systems. In the examples, which follow, optical anisotropy was determined by stir opalescence or by polarizing microscope.

Shaped Article Preparation

The above-described solutions may be formed into shaped articles, e.g., films, fibers, and fibrids. Useful films may be cast, using a variety of quenching media. Fibers of high quality may be prepared from these solutions by spinning them into suitable baths. Fibrids, useful for paper preparation, may be prepared from these solutions by means of the procedures described in Morgan — U.S. Pat. No. 2,999,788, using a suitable coagulant.

While these acidic solutions may be spun into fibers by conventional wet spinning techniques, it is preferred that fibers by prepared extruding the solutions through a short layer of gas, e.g., air, as described in Blades U.S. Pat. No. 3,767,756. Spinnerets and other apparatus should be constructed of materials resistant to the strong acids used. The thickness of the layer separating the spinneret face from the coagulating bath can vary from 0.1 to 5 cm. and is preferably from about 0.2 to 1.3 cm. thick. A variety of baths may be used to coagulate the solution into fibers. Satisfactory results have been obtained with aqueous baths.

Due to the degradative effects of even small amounts of residual acid in the fiber samples, the complete removal of the spinning solvent is very important for the attainment of high strength fibers. Water alone or combinations of alkaline solutions and water may be used for acid removal. A convenient method is to spray the threadline as it leaves the coagulating bath with an aqueous alkaline solution (e.g., saturated $NaHCO_3$), remove the surface liquid from the threadline with a wiping device (e.g., a sponge) or a jet, wash with water to reduce the acid content, and wind up the fiber on bobbins. It is preferred that the fibers be washed prior to being wound on bobbins. The thoroughly washed fibers can be dried on the bobbin in air at temperatures up to about 100° C. They can also be conveniently dried on heated rolls.

It will be understood that additives, inert to the solvent, as dyes, fillers, antioxidants, etc., can be incorporated into these solutions for the purposes intended, prior to shaped article preparation.

The fibers prepared from the optically anisotropic solutions of this invention exhibit significantly higher asextruded tensile properties than do prior art polyhydrazide fibers, e.g., those shown in U.S. Pat. Nos. 3,130,182; 3,642,707; and J. Poly. Sci., A, 2, 1147–1156 (1964). The tenacity values exhibited by the instant fibers is particularly high, often exceeding 10 g/d. The (co)polyhydrazide fibers of the invention generally are characterized by tenacity and modulus values of greater than about 8 g/d and 300 g/d, respectively.

MEASUREMENTS AND TESTS

Inherent Viscosity: Inherent viscosity ($\eta$inh) is defined by the following equation:

$$\eta\text{inh} = 1n\ (\eta\text{rel})/C$$

wherein ($\eta$rel) represents the relative viscosity and $C$ represents a concentration of 0.5 gram of the polymer in 100 ml of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30° C; the solvent is a solution of dimethylsulfoxide containing 5% lithium chloride.

Fiber Tensile Properties: Filament properties are measured as described in U.S. Pat. No. 3,836,498 (col. 6).

Spin Stretch Factor: The spin stretch factor is defined as follows:

$$\text{S.S.F.} = \frac{\text{Velocity of yarn at wind-up (ft/min)}}{\text{Velocity of dope through spinneret (ft/min)}}$$

where $$\text{Vel. of dope through spinneret} = \frac{\text{Rate of pumping (cu ft/min)}}{\text{No. of spinneret holes} \times \text{cross-sectional area of one hole (sq ft)}}$$

EXAMPLE 1

This example illustrates the preparation of poly(oxalyl/chloroterephthaloyl hydrazide) (50/50 mol % ratio) and poly(terephthaloyl/chloroterephthaloyl hydrazide) (50/50 mol % ratio).

Part A

A suspension of oxalyl dihydrazide (17.72 g, 0.15 mole) and LiCl (25.2 g, 0.60 mole) in 600 ml of DMAc, in a 1-liter resin kettle, under nitrogen, is stirred (for one half hr) and cooled in an ice-water bath. Chloroterephthaloyl chloride (35.62 g, 0.15 mole) is added dropwise through an addition funnel over a period of 72 minutes (stirring continued during addition). The contents of the reaction kettle are allowed to stand overnight, after which solid lithium carbonate (11.08 g) is added to neutralize the liberated hydrogen chloride. The clear, viscous dope which is obtained is combined in water to precipitate the polyhydrazide which is collected, washed (water: 5X, water/ acetone mixture: 1X, acetone: 1X), and dried in a vacuum oven at 100° C. There is obtained poly(oxalyl/chloroterephthaloyl hydrazide), 40.2 g, $\eta$inh = 2.75.

Part B

In a preparation similar to that of Part A, above, but one wherein (1)the dihydrazide suspension is stirred for two hours prior to addition of the diacid chloride, (2) the chloroterephthaloyl chloride is added at a slower rate (i.e., 82 minutes addition time), and (3) lithium carbonate is not added, there is obtained 42.6 g of poly(oxalyl/chloroterephthaloyl hydrazide), $\eta$inh = 2.40.

Part C

In preparation similar to Part B, above, but one wherein (1)the chloroterephthaloyl chloride is added over a period of 125 minutes and (2)lithium carbonate (11.08 g), is added as in Part A, above, there is obtained 41.2 g of poly(oxalyl/chloroterephthaloyl hydrazide), $\eta$inh = 2.08.

Part D

In a preparation similar to Part C, above, but one wherein (1)the dihydrazide suspension is stirred for 3 hours prior to addition of the diacid chloride and (2) the chloroterephthaloyl chloride is added over a period of 68 minutes, there is obtained 41 g of poly(oxalyl/chloroterephthaloyl hydrazide), $\eta$inh = 2.69.

Part E

A suspension (under nitrogen) of terephthaloyl dihydrazide (29.13 g, 0.15 mole) and LiCl (25.2 g, 0.60 mole) in 750 ml of DMAc is cooled in an ince-water bath. While stirring is continued, chloroterephthaloyl chloride (35.64 g, 0.15 mole) is added dropwise over a period of 182 minutes. The contents of the reaction vessel are allowed to stand overnight, after which solid lithium carbonate (11.1 g) is added to neutralize the liberated hydrogen chloride. The copolyhydrazide is precipitated and collected as in Part A, above, washed several times with water and once with acetone, and is first dried in air, then overnight in a vacuum oven at 100° C. There is obtained 46.2 g of poly(terephthaloyl/chloroterephthaloyl hydrazide), $\eta$inh = 1.44.

EXAMPLE 2

This example describes the preparation of anisotropic spinning solutions and fibers of the poly(oxalyl/chloroterephthaloyl hydrazides) and poly(terephthaloyl/chloroterephthaloyl hydrazide)whose syntheses are shown in Example 1. Solvents used are concentrated sulfuric acid (100.04% $H_2SO_4$)and a mixture thereof with fluorosulfonic acid (1/1 wt ratio). Copolymer content of each solution is 20% by weight. The general procedure presented below is used to prepare the solutions; spinning variables and fiber properties are listed in Table I below. In these spins, (SSF between 4.4 and 6.6; wind-up speed between 505 and 986 ft/min), the temperature of the aqueous coagulating bath is 1° C and the face of the spinneret (temperature between 25° C and 28° C) is positioned 10 mm vertically above the upper surface of the coagulating bath except for Item 4 (7 mm) and Item5 (9 mm).

The spinning solutions of the poly(oxalyl/chloroterephthaloyl hydrazide)(Items 1-5) are prepared by cooling the sulfuric acid to about 10° C (the sulfuric/fluorosulfonic acid mixtures are cooled to about 2° C), after which the polymer samples are added in portions. The ingredients are stirred in by hand and the polymer is added at a rate such that the temperature of the mixture does not rise above about 40° C. After all the polymer has been added, the composition is transferred to a twin cell unit described in the aforementioned Blades patent, at bath temperatures in the range of 25° to 30° C, mixed (8 to 11 passes), and spun according to the procedures shown in Table I. Elapsed time from initial mixing to completion of the spin is usually less than 2 hours.

The poly(terephthaloyl/chloroterephthaloyl hydrazide) solution (Item 6) is prepared in essentially the same manner, except that dissolution of the polymer and spinning is accomplished at about 28° C.

TABLE I

| Item | Polymer of Ex. | Solvent | No of Holes* | T | E | Mi | Den. |
|---|---|---|---|---|---|---|---|
| 1 | 1A | H | 10 | 8.1 | 3.4 | 344 | 1.52 |
| 2 | 1B | H | 10 | 11.0 | 5.3 | 346 | 2.69 |
| 3 | 1C | F | 20 | 10.2 | 6.5 | 326 | 1.65 |
| 4 | 1D | F | 20 | 10.0 | 6.1 | 324 | 1.39 |
| 5 | 1D | F | 20 | 9.7 | 4.5 | 345 | 1.12 |
| 6 | 1E | H | 20 | 3.2 | 2.8 | 227 | 3.07 |

Legend
H = 100.04% $H_2SO_4$
F = $_{FSO_3}H/H_2SO_4$(100.04%), 1/1 by wt.
*Hole diameter is 0.002 in. except for Item 6 (0.003 in.)

EXAMPLE 3

This example illustrates the preparation of poly(chloroterephthaloyl/terephthaloyl hydrazide)(1/1)and an anisotropic dope thereof in 100% sulfuric acid.

An ice-cooled solution of chloroterephthalic dihydrazide (4.56 g., 0.02 mole) in 50 ml. of HMPA is prepared in a tubular flask. To this stirred solution (paddle stirrer is added, with cooling, terephthaloyl chloride (4.06 g., 0.02 mole) in portions. Within 30 min. a viscous paste forms. Lithium carbonate (1.48 g.) is added to the stirred reaction mixture one half hr. later. After another 15 hr., during which the mixture is allowed to warm to room temperature, a clear, very viscous solution forms. The latter is combined with water to precipitate the polymer which is collected, washed separately with water and with methanol, and dried in a vacuum oven at 80° C. There is obtained 7.2 g. of product, $\eta$ inh = 1.07, having the repeating structural units

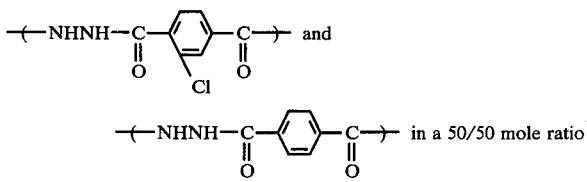

A 20% solids dope of this polymer in 100% sulfuric acid at 25° C. is optically anisotropic.

EXAMPLE 4

Illustrated in the example is the copolyhydrazide prepared from terephthaloyl dihydrazide and terephthaloyl chloride/2,5-pyridinedicarbonyl chloride (50/50), and an anisotropic dope thereof in 100% sulfuric acid.

An ice-cooled solution of terephthaloyl dihydrazide (1.94 g., 0.01 mole) in a mixture of HMPA(9 ml.) and NMP(9 ml.) is prepared and stirred (magnetic stirrer) in a 50 ml. Erlenmeyer flask. To this solution are added, with cooling, 2,5-pyridinedicarbonyl chloride(1.02 g., 0.005 mole) and terephthaloyl chloride(1.015 g., 0.005 mole). Lithium carbonate (0.74 g.)is added one hr. later.

The stirred reaction mixture is allowed to warm to room temperature in the next hour. After 14 hr. more, the cloudy viscous reaction mixture is worked up as in Example 3 to yield 2.99 g. of copolymeric product, $\eta$ inh = 0.43, comprising the structural units

A.

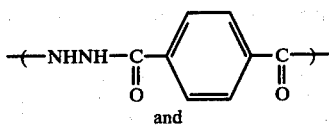

and

B.

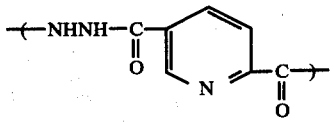

with A/B = 75/25 mole ratio

A 20% solids dope of this copolymer in 99.7% sulfuric acid is optically anisotropic.

EXAMPLE 5

In the following Table II are described optically anisotropic sulfuric acid solutions of other polyhydrazides and copolyhydrazides prepared by synthesis procedures equivalent to or similar to those described in Ex. 3 and 4. For each solution in the table are shown the repeating units(for copolymers, mole % shown), inherent viscosity, and amount of solids for each species; the solvent is 100% sulfuric acid at 25° C. The species described in this table are prepared from oxaloyl dihydrazide, terephthaloyl dihydrazide, chloroterephthaloyl dihydrazide, 2.5-pyridinedicarboxylic acid dihydrazide, terephthaloyl chloride, chloroterephthaloyl chloride, oxalyl chloride, and 2,5-pyridinedicarbonyl chloride.

TABLE I
ANISOTROPIC POLYHYDRAZIDE DOPES IN 100% SULFURIC ACID

| Item | Repeating Units* (mole % of each) | $\eta$inh | % Solids |
|---|---|---|---|
| 1 | Q | 0.77 | 20 |
| 2 | $Q_{50}R_{50}$ | 1.43 | 20 |
| 3 | $P_{50}Q_{50}$ | 2.06 | 20 |
| 4 | $R_{50}S_{50}$ | 1.67 | 10 |
| 5 | $Q_{75}S_{25}$ | 1.21 | 20 |
| 6 | $P_{50}Q_{25}S_{25}$ | Insol. | 20 |
| 7 | $P_{25}S_{25}Q_{25}R_{25}$ | 0.82 | 20** |
| 8*** | $R_{35}P_{15}S_{50}$ | 1.18 | 20 |
| 9 | $R_{20}S_{80}$ | 0.60 | 20 |

*Legend

Q = 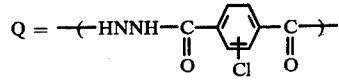

R = 

R = 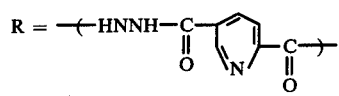

S = 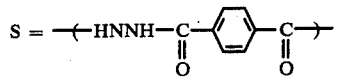

** solvent is 99.7% $H_2SO_4$
***Dopes in Items 8–16 are prepared in 100.59% $H_2SO_4$

TABLE II
ANISOTROPIC POLYHYDRAZIDE DOPES IN 100% SULFURIC ACID

| Item | Repeating Units* (Mole % of each) | $\eta$inh | % Solids |
|---|---|---|---|
| 10 | $P_{50}Q_{15}S_{35}$ | — | 20 |
| 11 | $P_{50}Q_{20}S_{30}$ | 0.57 | 20 |
| 12 | $Q_{25}R_{75}$ | 1.04 | 20 |
| 13 | $Q_{35}S_{65}$ | 1.43 | 20 |
| 14 | $P_{25}R_{15}S_{60}$ | 0.69 | 20 |
| 15 | $Q_{30}S_{70}$ | 0.92 | 20 |
| 16 | $Q_{25}P_{75}$ | 0.33 | 20 |
| 17 | $R_{65}S_{35}$ | 0.49 | 20 |
| 18 | $R_{70}S_{30}$ | 0.53 | 20 |

We claim:

1. A novel optically anisotrapic spinning solution comprising at least 5% by weight of a (co)polyhydrazide consisting essentially of repeating units of the formula

I.

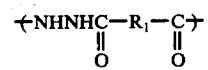

wherein the divalent radical $R_1$ in each repeating structural unit may be the same or different and is selected from the group of aromatic, carbocyclic and aliphatic radicals of from 1 to 12 carbon atoms; 2,5-pyridinediyl radicals or a chemical bond in a solvent selected from the group of concentrated sulfuric acid (at least 99.5% but not greater than 102%) or a mixture thereof with fluorosulfonic acid.

2. A solution according to claim 1 wherein the (co)polyhydrazide is poly(chloroterephthaloyl hydrazide) and copolymers thereof represented by repeating units of the formula

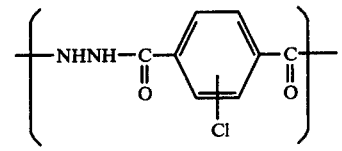

with up to 80 mole % (based on the total number of repeating units) of

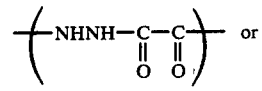 or

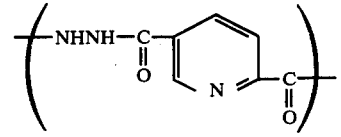

units or with up to 70 mole % (based on the total number of repeating units) of

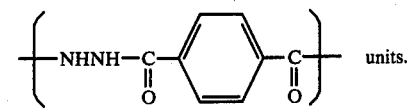 units.

3. The solution of claim 2 wherein the copolymer consists essentially of the following repeating units

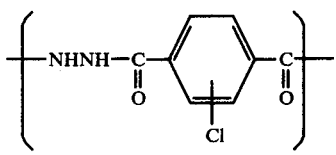

4. The solution of claim 2 wherein the copolymer consists essentially of the following repeating units

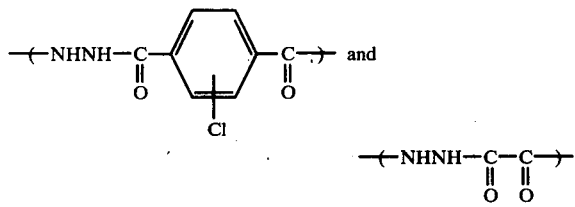

5. The solution of claim 2 wherein the copolymer consists essentially of the following repeating units

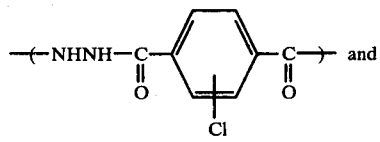

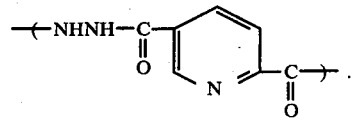

6. The solution of claim 2 wherein the copolymer consists essentially of the following repeating units

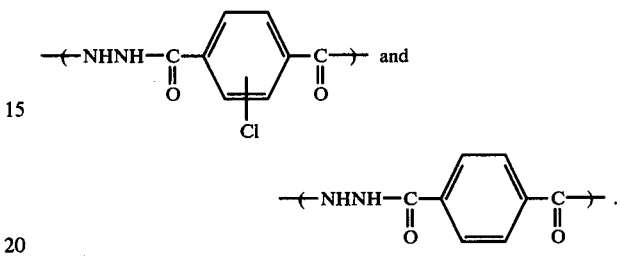

7. A solution according to claim 2 wherein there is between 15 and 20% by weight of the polymer.

8. The solution of claim 1 wherein the polymers exhibit inherent viscosities of at least about 0.4 as defined by the equation $\eta_{inh} = \ln(\eta rel)/C$ where the relative viscosity ($\eta rel$) is determined at 30° C by dividing the flow time in a capillary viscometer of a solution of 0.5 gm. of polymer in 100 ml of solvent (dimethylsulfoxide containing 5% lithium chloride) by the flow time for the pure solvent and where C is the concentration of the said solution.

* * * * *